United States Patent [19]

Takahashi

[11] Patent Number: 5,339,206

[45] Date of Patent: Aug. 16, 1994

[54] POSITIONING CONTROL METHOD AND APPARATUS OF HEAD WHICH IS USED IN MAGNETIC DISK APPARATUS

[75] Inventor: Eisaku Takahashi, Kawasaki, Japan

[73] Assignee: Fujitsu Limited, Japan

[21] Appl. No.: 21,328

[22] Filed: Feb. 23, 1993

[30] Foreign Application Priority Data

Mar. 31, 1992 [JP] Japan ................. 4-076629

[51] Int. Cl.⁵ .................. G11B 21/02; G11B 5/596
[52] U.S. Cl. ................. 360/75; 360/78.04; 360/78.09; 360/78.12
[58] Field of Search ........... 360/75, 77.02, 77.01, 360/73.01, 78.07, 78.14, 73.03, 78.09, 77.04

[56] References Cited

U.S. PATENT DOCUMENTS

| | | | |
|---|---|---|---|
| 4,755,977 | 7/1988 | Abed | 369/32 |
| 5,159,254 | 10/1992 | Teshima | 318/611 |
| 5,182,684 | 1/1993 | Thomas et al. | 360/78.09 |

FOREIGN PATENT DOCUMENTS

| | | |
|---|---|---|
| 61-58488 | 3/1986 | Japan . |
| 63-152067 | 6/1988 | Japan . |
| 64-73574 | 3/1989 | Japan . |
| 2-154377 | 6/1990 | Japan . |
| 3-176872 | 7/1991 | Japan . |

Primary Examiner—Aristotelis Psitos
Assistant Examiner—Varsha V. Sheladia
Attorney, Agent, or Firm—Greer, Burns & Crain, Ltd.

[57] ABSTRACT

A mechanical variation of a voice coil motor and an electrical variation of a servo loop are corrected, thereby performing a head positioning control of a high accuracy. When a measurement mode is set, a zero-cross frequency $f_0$ at which a gain of open loop characteristics of the servo loop is set to 0 dB (gain =1) is known. By adding the frequency $f_0$ to the servo loop, an open loop gain $G_{OP}$ is obtained. A correction coefficient K to set the open loop gain into an ideal value 0 dB (gain=1) is obtained as $K=1/G_{OP}$ and is stored into a correction table. In the ordinary access, a drive signal of an actuator is corrected by a correction coefficient K read out with reference to the correction table in accordance with the present cylinder position and the corrected drive signal is sent to the actuator.

16 Claims, 11 Drawing Sheets

FIG.7

| ZONE No. | CYLINDER No. | COMPLEMENTARY COEFFICIENT |
|---|---|---|
| ZONE 0 | 0 ~ 99 | $K_0$ |
| ZONE 1 | 100 ~ 199 | $K_1$ |
| ZONE 2 | 200 ~ 299 | $K_2$ |
| ZONE 3 | 300 ~ 399 | $K_3$ |
| ZONE 4 | 400 ~ 499 | $K_4$ |
| ZONE 5 | 500 ~ 599 | $K_5$ |
| ZONE 6 | 600 ~ 699 | $K_6$ |
| ZONE 7 | 700 ~ 799 | $K_7$ |
| ZONE 8 | 800 ~ 899 | $K_8$ |
| ZONE 9 | 900 ~ 999 | $K_9$ |
| ZONE 10 | 1000 | $K_{10}$ |

POSITIONING CONTROL METHOD AND APPARATUS OF HEAD WHICH IS USED IN MAGNETIC DISK APPARATUS

BACKGROUND OF THE INVENTION

The present invention relates to positioning control method and apparatus of a head which is used in a magnetic disk apparatus for positioning the head to the designated cylinder position and, more particularly, to positioning control method and apparatus of a head for positioning the head by correcting characteristics of a head actuator so as to eliminate a variation of the characteristics of the head actuator which differ in dependence on the rotating position of a magnetic disk.

In recent years, in a magnetic disk apparatus, a high accessing speed and a high positioning accuracy are needed in association of the realization of a high operating speed and a large capacity. When such a high accurate positioning control is performed, a variation in mechanical accuracy of the head actuator, a gain error of an electric servo loop, and the like become obstacles.

In the conventional magnetic disk apparatus, a head 12 is positioned by using a voice coil motor (VCM) 10 as shown in FIG. 1. In FIG. 1, the voice coil motor 10 has a structure such that a force is generated by both of fixed permanent magnets 24 and movable coils 26. Now, assuming that a magnetic flux density which is applied from the permanent magnet 24 to the coil 26 is set to B and an effective length of the coil is set to L and a current flowing in the coil is set to I, a force F is obtained by the following equation.

$$F = B \times L \times I \quad (1)$$

Therefore, the force F which acts on the voice coil motor 10 and which is expressed by the equation (1) can be controlled by the current I flowing in the coil 26 and the head 12 can be positioned to a target cylinder position over a magnetic disc 22.

In such a conventional voice coil motor 10, however, since the permanent magnet 24 has a finite length, there are characteristics such that the magnetic flux density B is small in the edge portion of the permanent magnet 24 and is large in the central portion. The force F which is applied to the voice coil motor 10 consequently fluctuates due to a variation in magnetic flux density B in dependence on the position of the permanent magnet 24 and a positioning control accuracy is not improved.

On the other hand, a variation in magnetic flux density B of each magnet is large on manufacturing. The force F is influenced by a variation in permanent magnets 24 assembled in the apparatus, a variation in constants of an electric circuit in a control loop, or the like, so that the high accurate positioning control is obstructed.

FIG. 2 shows a change in force (relative value) when the head position is changed every other predetermined number of cylinders with respect to voice coil motors used in three magnetic disk apparatuses as an example. For instance, as will be obviously understood from characteristics 28, the relative value of the force shown by an axis of ordinate decreases in association with the movement of the head from the center position to the inner side and there is also a decreasing tendency of such a force with respect to the head movement toward the outer side.

With respect to the other voice coil motors, there are variations as shown in characteristics 30 and 32 and a change in force to a change in head position has a peculiar value although they have similar tendencies. It is, consequently, difficult to perform the positioning control of a high accuracy due to a variation in characteristics of the voice coil motors.

SUMMARY OF THE INVENTION

According to positioning control method and apparatus of a head which is used in a magnetic disk apparatus of the present invention, a mechanical variation due to the rotating position of a head actuator using a voice coil motor is corrected and a positioning control of a high accuracy can be performed.

According to the present invention, there is provided a magnetic disk apparatus which performs a servo control such that when a cylinder number (cylinder address) of a disk medium which is accessed by a command from a higher-order apparatus is designated, a head is moved to a target cylinder position by a speed control (seek control) of an actuator, and when the head reaches the target cylinder position, a control mode is switched to a position control (fine control), thereby allowing the head to trace a target track.

To accomplish such a magnetic disk apparatus, according to the present invention, when a measurement mode is set, a zero-cross frequency $f_0$ at which a gain of open loop characteristics of a servo loop is set to 0 dB (gain=1) is obtained and added to the servo loop of the frequency $f_0$, thereby obtaining an open loop gain $G_{OP}$. When the actual open loop gain $G_{OP}$ is known, a correction coefficient K to set the open loop gain to an ideal value of 0 dB (gain=1) can be derived by $$K = 1/G_{OP}$$

In the measurement mode, the correction coefficient K is obtained from the open loop gain $G_{OP}$ every cylinder position and a correction table is updated. That is, upon setting of the measurement mode, in a state in which the head has been moved to a predetermined cylinder position by a servo control section and the position control has been performed, a sine wave signal having the zero-cross frequency $f_0$ of the open loop gain characteristics is added to a drive signal of the actuator and an addition signal X is supplied to the actuator. The open loop gain $G_{OP}$ is calculated from both of the addition signal X and an actual position deviation signal Y which is fed back by the driving of the actuator by the addition signal X. Further, a new correction coefficient K is calculated by the product of the reciprocal number of the open loop gain $G_{OP}$ and the correction coefficient K used in the measurement. The calculated correction coefficient K is stored into a correction table while using the cylinder position as an address pointer.

In the ordinary operating mode, the correction coefficient K which has been read out from the correction table is multiplied to the drive signal of the actuator generated from the servo control section, thereby correcting the drive signal in accordance with the cylinder position at which the head is at present located. After that, the corrected drive signal is supplied to the actuator.

In the measuring process, just after the power source of the apparatus was turned on, the correction coefficient K which has previously been obtained on the basis of mechanical and electrical mean variations, namely, the correction coefficient K obtained by a statistical method is stored into the correction table. The correction table is updated by the correction coefficient K obtained by the first measuring operation. After that, the measurement mode is set in accordance with a predetermined time schedule and the correction coefficient K of the correction table is updated. A time interval to set the measurement mode in accordance with the time schedule is set to a time interval which increases with the elapse of time from the turn-on the power source.

On the other hand, since it is troublesome to obtain the correction coefficients with regard to all of the cylinder positions, a plurality of cylinders are set to one group and a region on the disk recording medium is divided into a plurality of zones $Z_i$ (i=0 to n). The correction coefficient obtained by designating a predetermined cylinder position of each zone $Z_i$ is stored into the correction table on a zone unit basis.

In the correction of the drive signal in this case, the correction coefficient K of the target cylinder position is calculated by an interpolating calculation based on the correction coefficient $K_i$ of the zone $Z_i$ to which the target cylinder belongs and the correction coefficient $K_{i+1}$ of the adjacent zone $Z_{i+1}$. When it is now assumed that the interpolating calculation is executed on the basis of the linear interpolation, the target cylinder position is divided by the number of cylinders per zone, thereby obtaining the belonging zone $Z_i$ and the number C of remaining cylinders. The correction coefficient K at the target cylinder position is calculated by the following equation.

$$K = K_i + \frac{(K_{i+1} - K_i) \cdot \text{remaining number } C}{\text{(the number of cylinders per zone)}}$$

On the other hand, in the measuring process of the correction coefficient, a sine wave having the zero-cross frequency $f_0$ is continuously generated for a plurality of cycles and the correction coefficient K is calculated from the mean value of a plurality of open loop gains $G_{OP}$ obtained by the generation of the sine waves for a whole cycle angle $\theta$.

More specifically speaking, a discrete value (sine value data) of each predetermined angle $\Delta\theta$ of the sine wave having the zero-cross frequency $f_0$ is generated for a plurality of cycles. The open loop gain $G_{OP}$ is calculated every generation of the discrete value. The correction coefficient K is calculated from the mean value of a plurality of open loop gains $G_{OP}$ obtained by the generation of the discrete values for the whole cycle angle $\theta$.

According to the positioning control of the head of the present invention as mentioned above, an attention is paid to that a mechanical variation of the voice coil motor and an electrical variation of the servo loop appear as a fluctuation in zero-cross frequency of the open loop gain in the positioning servo loop of the voice coil motor. A correction is made so that the zero-cross frequency of the open loop gain is set to the predetermined frequency $f_0$ which has been predicted, so that all of the mechanical and electrical variations can be corrected in a lump.

Thus, the forces which are generated from the voice coil motor at all of the cylinder positions are almost constant and, even when the apparatus differs, the characteristics of the voice coil motor are almost constant, and the positioning control of a high accuracy corresponding to a high density recording can be executed.

The above and other objects, features, and advantages of the present invention will become apparent from the following detailed description and the appended claims with reference to the accompanying drawings.

BRIEF DESCRIPTION OF THE DRAWINGS

FIG. 7 is an explanatory diagram of a correction table which is divided into a plurality of zones and which is used in the present invention;

DETAILED DESCRIPTION OF THE PREFERRED EMBODIMENT

Figure 1:
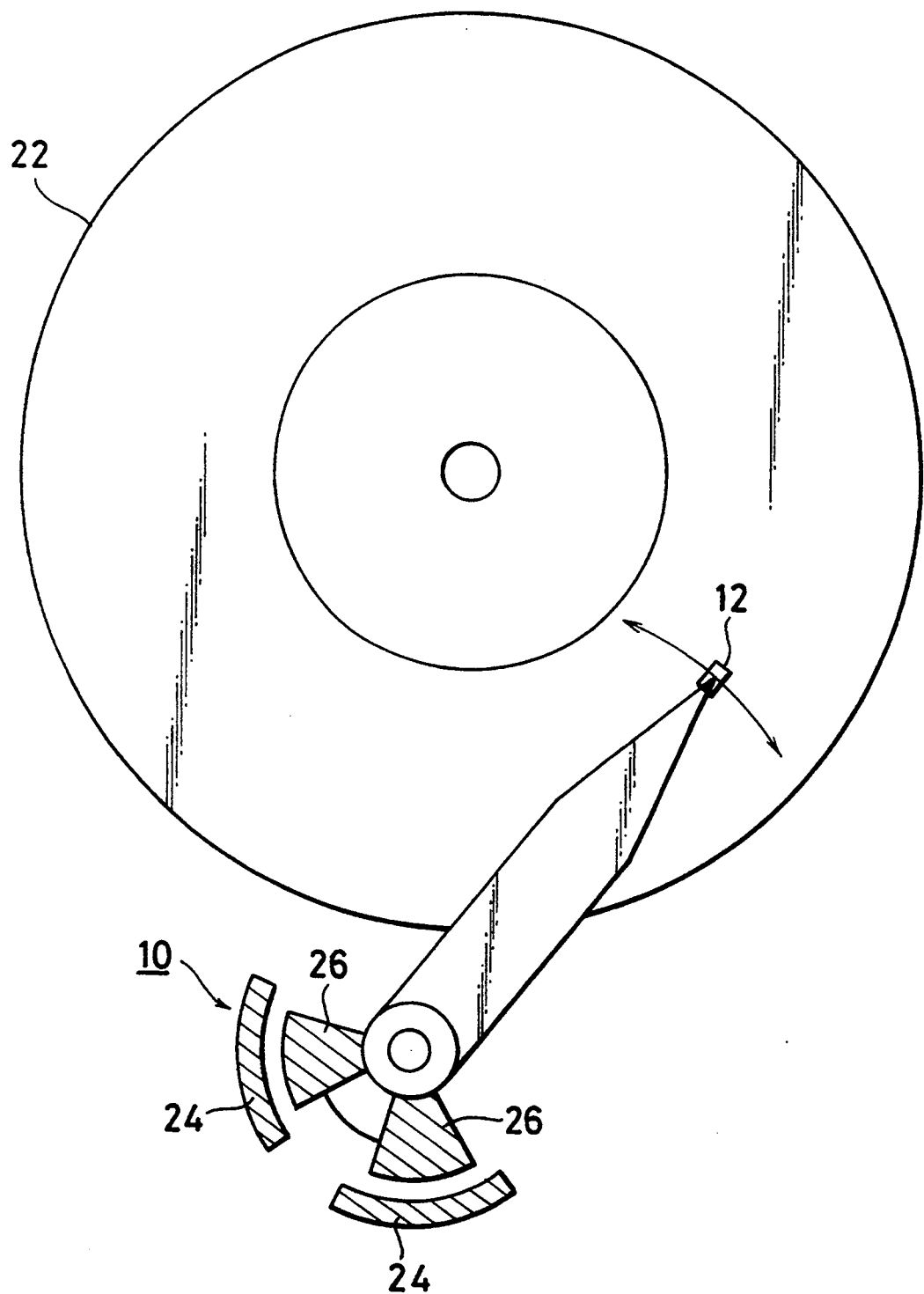
FIG. 1 is an explanatory diagram showing a fundamental structure of a voice coil motor.
Figure 2:
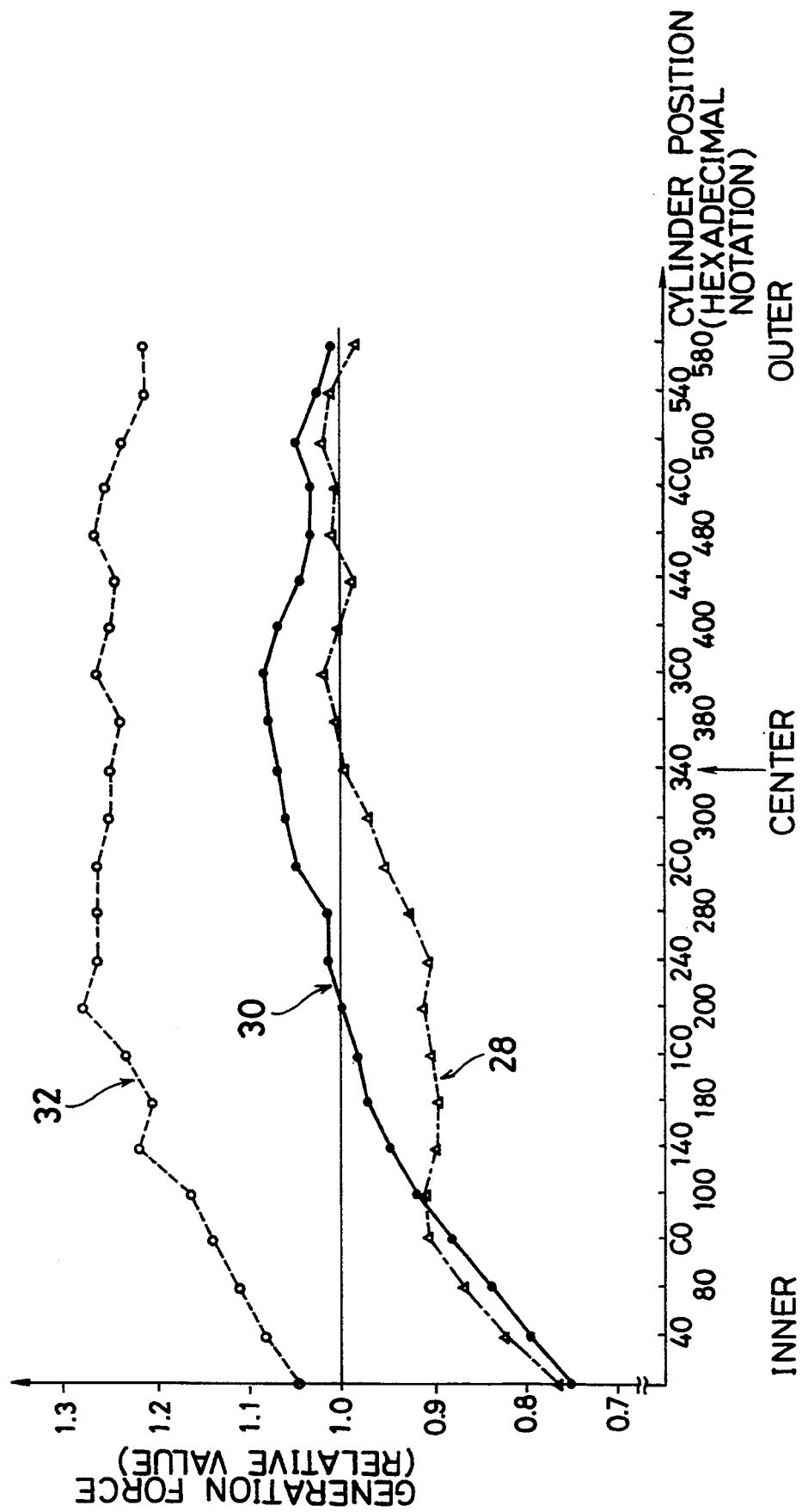
FIG. 2 is an explanatory diagram showing a generation force (relative value) from a voice coil motor to the cylinder position with respect to each of three magnetic disk apparatuses.
Figure 3:
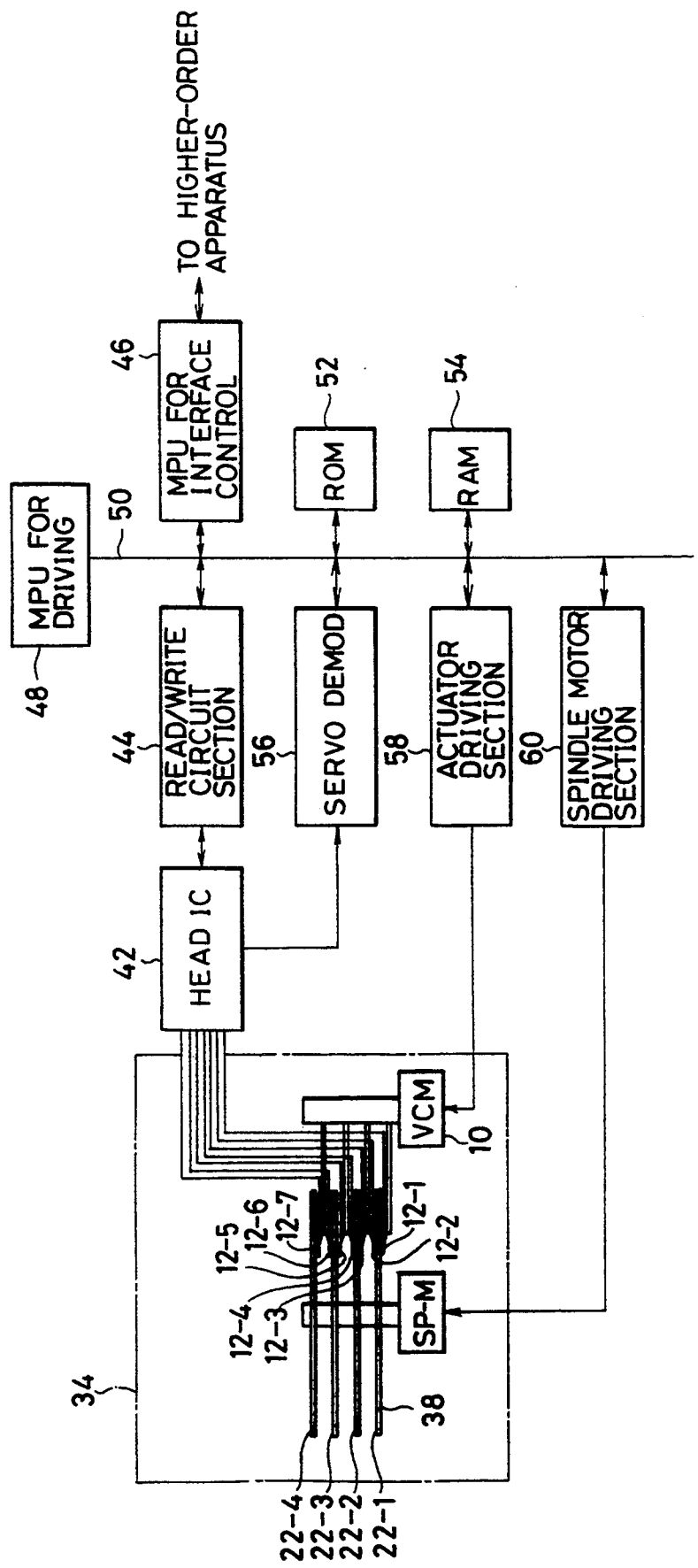
FIG. 3 is a constructional diagram showing a construction of a hardware of the present invention.

In FIG. 3, reference numeral 34 denotes a disk enclosure in which, for example, four magnetic disks 22-1 to 22-4 are attached to a rotary shaft of a spindle motor 36. Among the four magnetic disks 22-1 to 22-4, the bottom surface of the lowest magnetic disk 22-1 is used as a servo surface 38. Servo information which is used for the positioning control of the head is written on the servo surface 38 with respect to all of the cylinders. Disc surfaces of the magnetic disks 22-1 to 22-4 other than the servo surface 38 are used as data surfaces.

With respect to the disk surfaces of the magnetic disks 22-1 to 22-4, data heads 12-2 to 12-7 are arranged with respect to the data surfaces and a servo signal and connects it to a read/write circuit 44.

When a read command is received from a higher order apparatus through an MPU 46 for interface control, the read/write circuit 44 demodulates the data read out from the data head after completion of the head positioning control and transfers the demodulated data to the higher order apparatus side. When a write command is received from the higher order apparatus, on the other hand, the read/write circuit 44 modulates write data and writes the modulated write data by the data head after the head was positioned.

Various kinds of controls including the positioning control of the magnetic disk apparatus are executed by an MPU 48 for driving. An internal bus 50 is led out from the driving MPU 48. An ROM 52 in which a control program for driving has been stored, an RAM 54 to store various kinds of control data and correction data which is used in the present invention, a servo demodulating section 56, an actuator driving section 58, and a spindle motor driving section 60 are connected to the internal bus 50.

The servo demodulating section 56 demodulates a clock signal and a position signal from servo information derived from the servo head 12-1 on the disk enclosure 34 side and supplies the demodulates signals to the head 12-1 is arranged with regard to the servo surface 38. The servo heads 12-1 and data heads 12-2 to 12-7 are supported through arms to the rotary shaft of the voice coil motor 10 which operates as an actuator.

Figure 4:
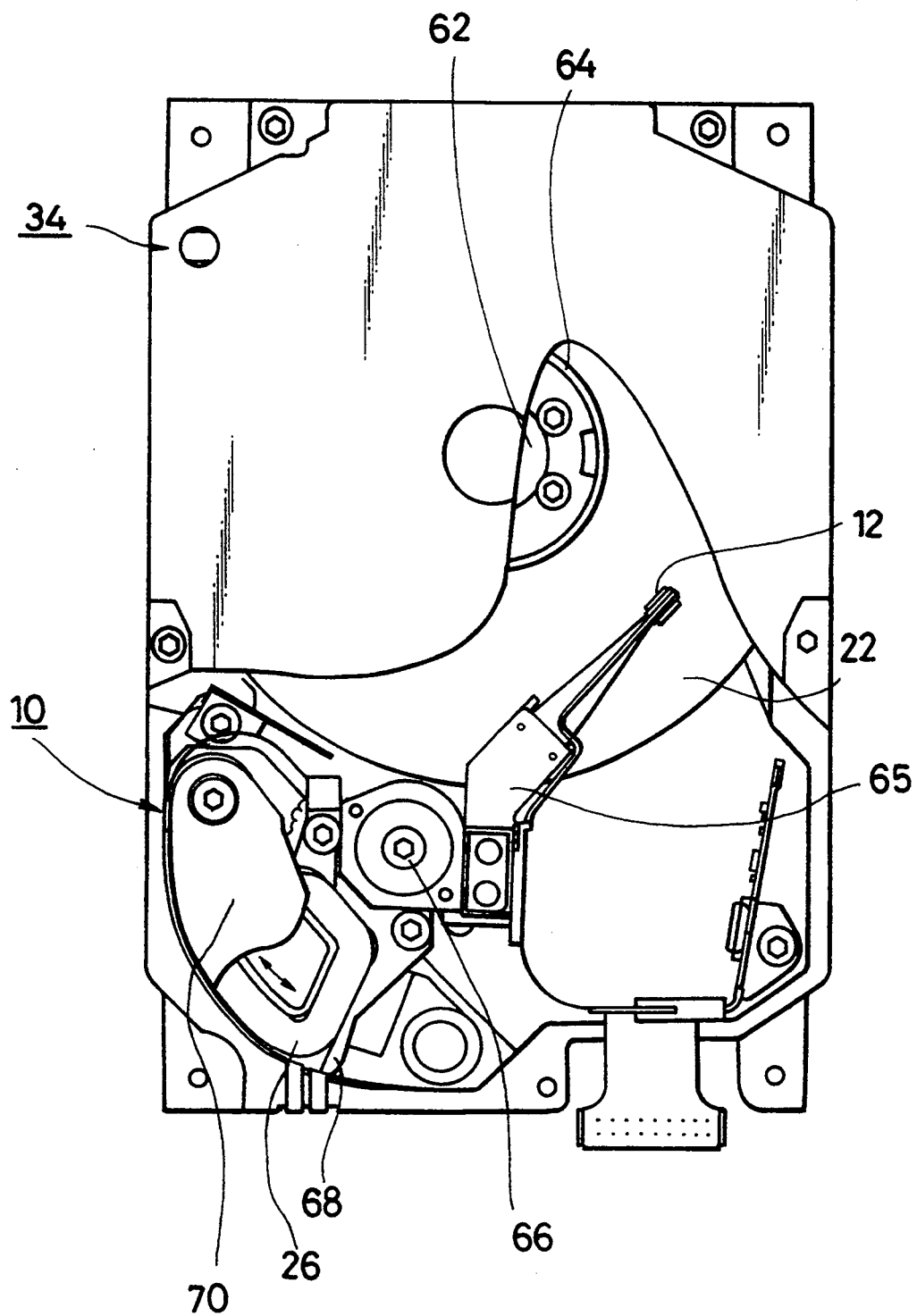
FIG. 4 is an external view of a disk enclosure.

FIG. 4 is an explanatory diagram with a part cut away showing an external view of the disk enclosure 34 in FIG. 3. In FIG. 4, the magnetic disk 22 is attached to a rotary shaft 62 of the spindle motor in the disk enclosure 34 by a disk clamp 64. The voice coil motor 10 is attached to the outside of the disk 22 via a rotary shaft 66. The coil 26 is arranged on the movable side of the voice coil motor 10 by a bobbin 68. On the other hand, a magnetic circuit 70 is provided on the fixed side of the VCM 10. An arm 65 is extended from the rotary shaft 66 toward the disk surface of the magnetic disk 22. The head 12 is supported to an edge of the arm 65. A plurality of magnetic disks are also attached below the magnetic disk 22 and data heads 12 are similarly supported through arms 65.

Returning to FIG. 3, signal lines from the data head 12-2 and servo head 12-1 provided on the disk enclosure 34 side are connected to a head IC 42. A head switching circuit is provided in the head IC 42 for a plurality of data heads 12-2 to 12-7. The head switching circuit selects either one of the data heads by a control driving MPU 48. The actuator driving section 58 receives drive data of the voice coil motor 10 derived by a servo control function of the driving MPU 48 and converts into analog signal and drives the voice coil motor 10, thereby performing the positioning control to the servo head 12-1 and data heads 12-2 to 12-7.

Further, the spindle motor driving section 60 is activated at the turn-on of a power source of the apparatus and controls the spindle motor 36 using a brushless DC motor so as to rotate at a predetermined rotational speed.

When a seek command is received from the higher order apparatus in response to the write command or read command, the driving MPU 48 controls the rotational speed of the voice coil motor 10 through the actuator driving section 58, thereby moving the servo head 12-1 and data head 12-2 toward the target cylinder position designated by the seek command. The control mode is switched to the position control just before those heads reach a target track position by the above speed control, thereby allowing the heads to trace so that the position signal which is obtained from the servo demodulating section 56 is set to "0" at the track center position.

According to the invention, further, the driving MPU 48 has a function such that with respect to a servo loop for performing the head positioning control by the voice coil motor 10 in a setting state of the measurement mode, a zero-cross frequency $f_0$ at which the open loop gain is equal to 0 dB (gain=1) is presumed and a sine wave signal having the zero-cross frequency $f_0$ is added to the servo loop, thereby obtaining an open loop gain $G_{OP}$. The driving MPU 48 also has a function such that a new correction coefficient K is obtained by the product of the reciprocal number of the open loop gain $G_{OP}$ obtained and the correction coefficient K used in the measurement and a correction table in which the correction coefficients K have been stored is updated every cylinder position. The MPU 48 further has a function such that a drive current which is supplied from the actuator driving section 58 to the voice coil motor 10 is corrected by using the correction coefficient in the correction table.

Figure 5:
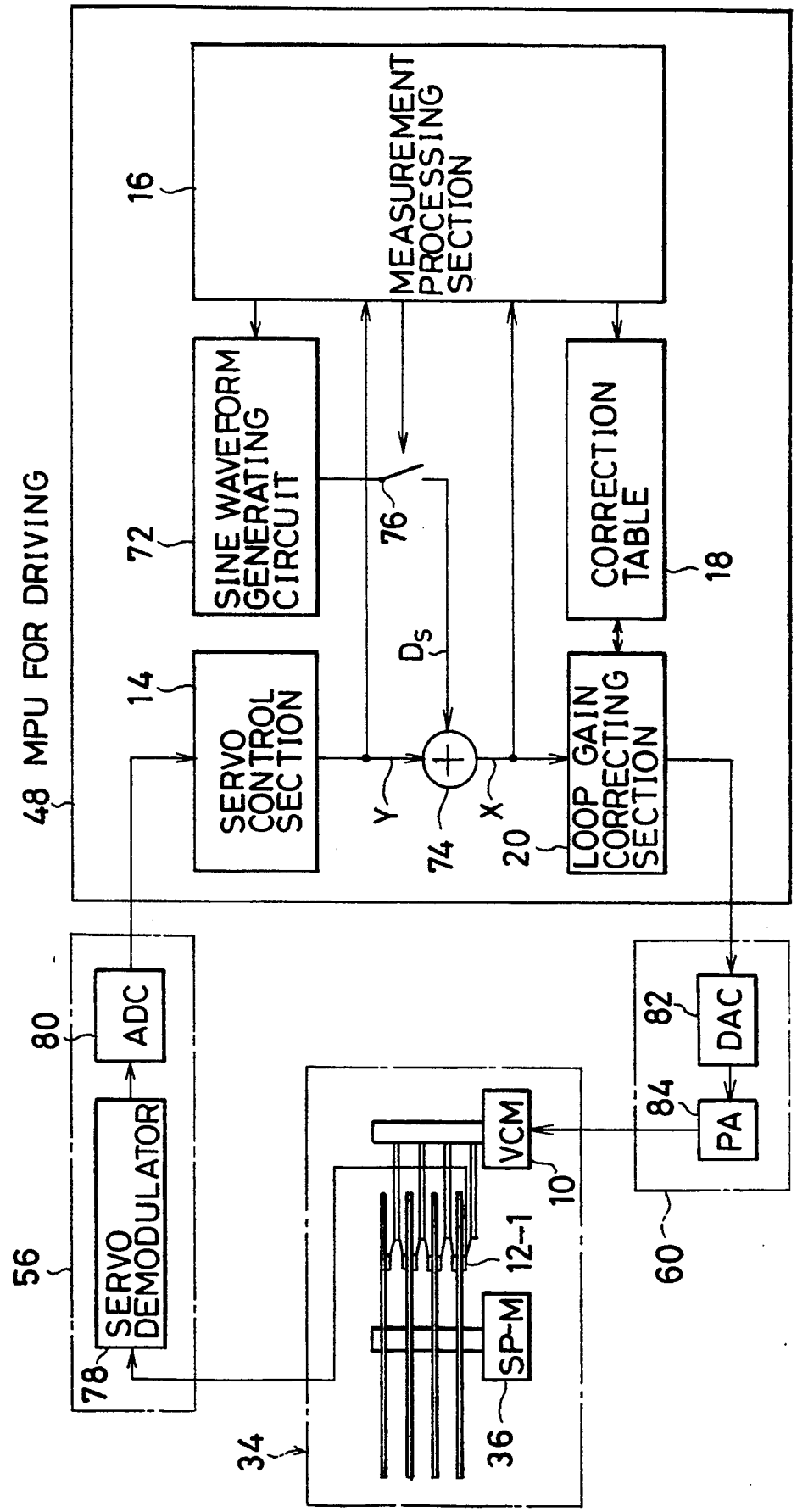
FIG. 5 is a functional block diagram of an MPU for driving in FIG. 3.

FIG. 5 shows a functional block diagram of the present invention which is realized by a program control of the driving MPU 48 in FIG. 3. In FIG. 5, a servo control section 14, a measurement processing section 16, a correction table 18, a loop gain correcting section 20, an adding section 74, and a measurement mode switch 76 are provided in the MPU 48. The position signal based on the servo information from the servo head 12-1 which has been demodulated by the servo demodulating section 56 is supplied to the servo control section 14. The servo demodulating section 56 comprises a servo demodulating circuit 78 and an A/D converter 80.

In a non-measurement mode which is ordinarily accessed, when the seek command based on the read command or write command is received, the servo control section 14 sets drive data based on the speed control or position control into a D/A converter 82 of the actuator driving section 58 through the adding section 74 and loop gain correcting section 20 and converts into the analog signal, thereby allowing the drive current I to flow in the coil of the voice coil motor 10 through a power amplifier 84.

The measurement processing section 16 executes a measuring process to obtain the correction coefficient K which is stored into the correction table 18 in a setting state of the measurement mode. The measurement mode for making the measurement processing section 16 operative is executed just after a rezero response which is set into a ready state by the turn-on of the power source of the magnetic disk apparatus was derived and is also executed every subsequent desired time interval. Specifically speaking, a mechanical variation of the voice coil motor 10 and an electrical variation of the servo loop fluctuate due to a temperature change of the magnetic disk apparatus. Therefore, just after the power source was turned on, the measuring process is executed at a short time interval. In association with the elapse of a time from the power-ON, a time interval for measurement is gradually increased. In the state which is stable in terms of temperature, the measuring process is repeated for every predetermined longest time interval.

The measurement principle to obtain the correction coefficient K by the measurement processing section 16 will now be described. First, the mechanical variation of the voice coil motor 10 and the electrical variation of the servo loop appear as a fluctuation of the zero-cross frequency $f_0$ at which the gain of the open loop characteristics in the positioning servo loop of the voice coil motor 10 is equal to 0 dB (gain=1).

Figure 6:
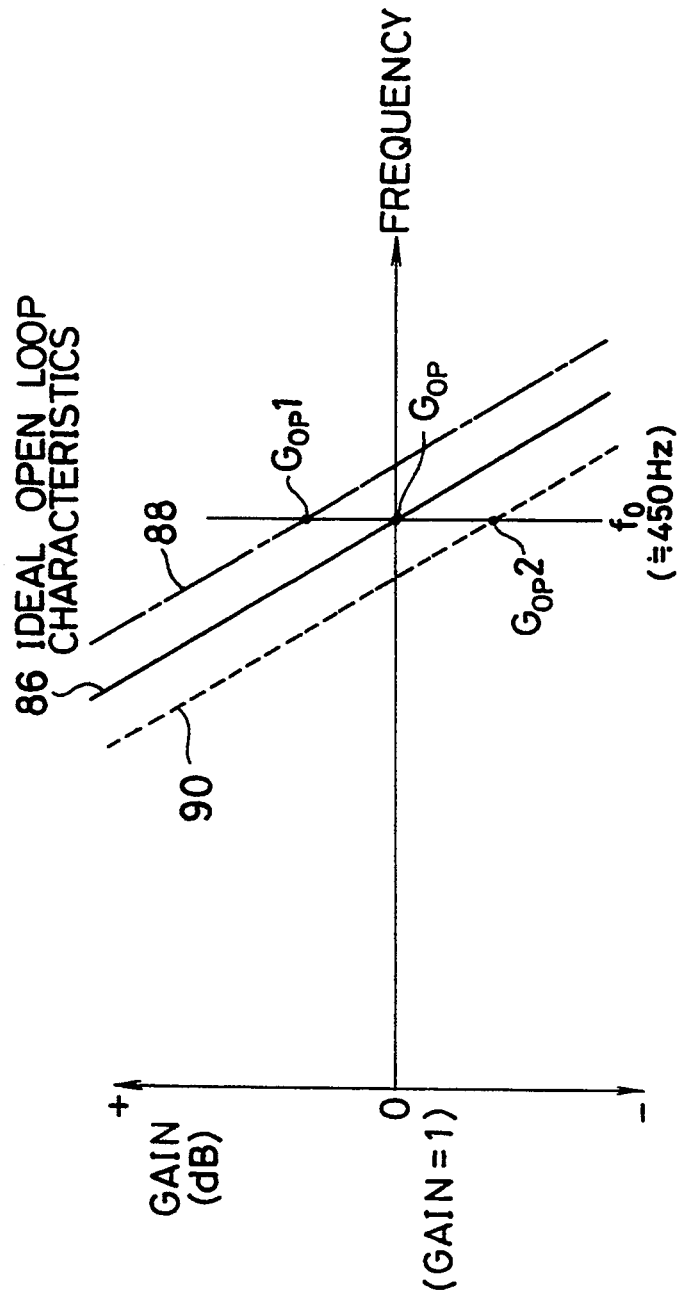
FIG. 6 is an explanatory diagram showing a zero-cross portion of open loop characteristics of a positioning servo loop in FIG. 3.

FIG. 6 shows characteristics regarding the zero-cross frequency portion of the open loop characteristics of the voice coil motor 10. Characteristics 86 which pass the zero-cross frequency $f_0$ for example, $f_0=450$ Hz of the open loop characteristics by the voice coil motor 10 give ideal open loop characteristics. For such ideal open loop characteristics 86, actual open loop characteristics have a variation and the zero-cross frequency is deviated from the ideal frequency $f_0$ due to the cylinder position as shown in characteristics 88 and 90. According to the present invention, therefore, the deviated open loop characteristics 88 and 90 are corrected so that their zero-cross frequencies are set to the zero-cross frequency $f_0$ of the presumed ideal open loop characteristics 86.

To perform such a correction, open loop gains $G_{OP1}$ and $G_{OP2}$ of the characteristics 88 and 90 at the zero-cross frequency $f_0$ are measured and coefficients $K_1$ and $K_2$ adapted to set the values of those open loop gains to 0 dB are obtained. Practically speaking, it is proper to obtain the correction coefficients $K_1$ and $K_2$ as reciprocal numbers of the open loop gains $G_{OP1}$ and $G_{OP2}$ obtained in the characteristics 88 and 90. That is, $$K_1 = 1/G_{OP1}$$

$$K_2 = 1/G_{OP2}$$

On the other hand, the loop gain $G_{OP}$ at the zero-cross frequency $f_0$ at a certain track position is obtained as follows. First, the head is positioned to a target track for measurement. In this state, as shown in FIG. 5, a sine wave waveform at the zero-cross frequency $f_0$ is added to the servo loop from the adding section 74 by a sine wave waveform generating section 72. Subsequently, an addition value X just after the sine wave waveform was added to the adding section 74 is measured. A position deviation signal Y indicative of the actual head gain which is detected by the servo head 12-1 due to the driving of the voice coil motor 10 on the basis of the addition value X is measured. The open loop gain $G_{OP}$ can be calculated by the following equation $$G_{OP} = Y/X$$

from the out! put Y to the input X for the servo loop.

In the actual measuring process of the open loop gain $G_{OP}$, a sine wave of the zero-cross frequency $f_0$ is generated for a plurality of cycles, the open loop gain $G_{OP}$ of the zero-cross frequency $f_0$ is obtained from the mean value of the sine waves for a plurality of cycles, and a new correction coefficient K is finally calculated on the basis of the product of the reciprocal number of the open loop gain $G_{OP}$ and the correction coefficient K used in the measurement and is stored into the correction table 18.

Although it is desirable to calculate the correction coefficient K every cylinder of the magnetic disk 22, it takes a time to execute the measuring process because the number of measuring times is large. Even if the measuring times differs by about one cylinder, there is not so a difference between the correction coefficients. Therefore, a plurality of cylinders are set to one unit, the region of the magnetic disk 22 is divided into a plurality of zones, one cylinder position is obtained every zone, and the correction coefficient is obtained by the measuring process.

FIG. 7 is an explanatory diagram showing an example of the contents in the correction table 18 obtained by tile zone division. In FIG. 7, the number of cylinders per zone is set to 100 and the total number of cylinders is set to 1000. Therefore, the number of zones is set to 10 and those ten zones are indicated by zone numbers 0 to 9. For instance, the zone No. 10 denotes the re-zero position. The cylinder numbers are allocated on a unit basis of 100 cylinders in correspondence to the zone Nos. 0 to 9.

In such a zone division, the measuring process by the measurement processing section 16 in FIG. 5 are sequentially executed at the cylinder positions 0, 100, 200, - - -, 900, and 1000 of the underlined cylinder numbers, so that correction coefficients $K_0$, $K_1$, - - -, $K_9$, and $K_{10}$ are stored.

The measuring process in the positioning control apparatus of the present invention and the positioning control using the correction data after completion of the measurement will now be described in detail hereinbelow with reference to FIG. 8.

Figure 8:
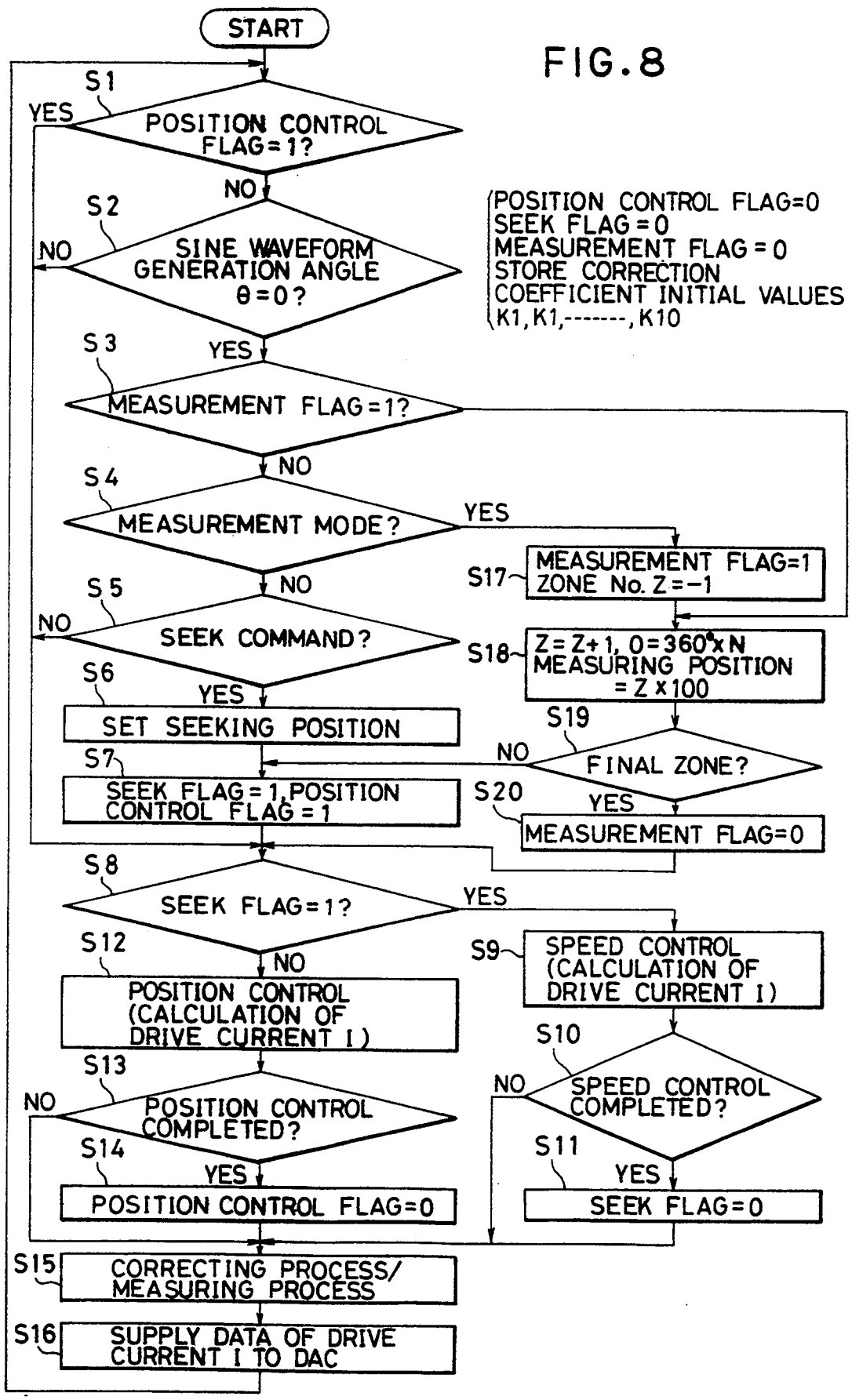
FIG. 8 is a flowchart showing a positioning control process according to the invention.

In FIG. 8, when the power source of the apparatus is first turned on and the processes are started, the correction coefficient values $K_0$ to $K_{10}$ derived on the basis of the average mechanical and electrical variations are stored as an initial process. Further, a position control flag, a seek flag, and a measurement flag are respectively reset to "0". After that, the processing routine advances to step S1 and a check is made to see if the position control flag has been set to "1" or not. Since the position control flag is set to "0" in the initial state, step S2 follows and a check is made to see if a sine wave waveform generation angle $\theta$ is equal to 0° or not. Since $\theta = 0°$ in the initial state, step S3 follows.

A check is made in step S3 to see if the measurement flag has been set to "1" or not. Since the measurement flag is set to "0" in the initial state, step S4 follows and a check is made to see if the measurement mode has been set or not. In the initial state after re-zero was obtained by the power-ON of the apparatus, the first measurement mode is set. Therefore, the processing routine advances to step S17 and the measurement flag is set to "1" and the zone No. Z as a target for measurement is set to "−1".

In step S18, the zone No. Z is increased by "1" and the first measurement zone is set to Z=0. As a sine wave waveform generation angle $\theta$, the following value indicative of one cycle is set.

(360°)×(value of the number N of cycles)

Further, as a measurement cylinder position, the number (=100) of cylinders per zone is multiplied to Z. In this case, since Z=0, the measurement cylinder position =0 cylinder is designated.

In the next step S19, a check is made to see if the zone No. indicates the final zone, for instance, Z=10 or not. Since the zone No. doesn't indicate the final zone, step S7 follows and the seek flag and the position control flag are respectively set to "1". When it is decided in step S8 that the seek flag is equal to "1", step S9 follows and the drive current I is calculated so that the head is sought to the position of the cylinder No. 0 as a measurement cylinder position obtained in step S18 by the speed control. In step S10, a check is made to see if the speed control has been completed or not. If YES, the seek flag is reset to "0" in step S11.

The process in step S15 is executed in any of the cases during the speed control and after completion of the speed control. However, the measuring process is not executed during the speed control and the correcting process is performed by the initial value of the correction coefficient stored just after the power-ON. The processing routine advances to step S16 and the drive current I corrected in step S15 is supplied to the D/A converter 82 and the voice coil motor 10 is driven. After completion of the process in step S16, the processing routine is returned to step S1. In this instance, since the position control flag has been set to "1" in step S$7, the processing routine immediately advances to step S8. The processes in steps S9, S10, S15, and S16 are repeated until the seek flag is reset to "0" in step S11 due to the completion of the speed control.

When the speed control is completed and the seek flag is reset to "0", the processing routine advances from step S8 to step S12 and the position control is executed so that the position signal from the servo head is set to the zero signal indicative of the center of the track. The drive current I of the voice coil motor which is necessary for position control is calculated.

In step S13, a check is made to see if the position control has been completed, namely, the pull-in to the track center has been finished or not. If YES, step S14 follows and the position control flag is reset to "0". When the position control flag is reset to "0" in step S14, the measuring process in step S15 is executed. The measuring process in step S15 is shown in detail as steps S100 to S106 of a subroutine in FIG. 9. Steps S100 and S101 relate to a correcting process of an actuator drive signal. Upon setting of the first measurement mode, a predetermined fixed value is used. After the second and subsequent measuring times, the preceding measured value is used. The correcting process will be obviously explained in detail hereinlater.

Figure 10:
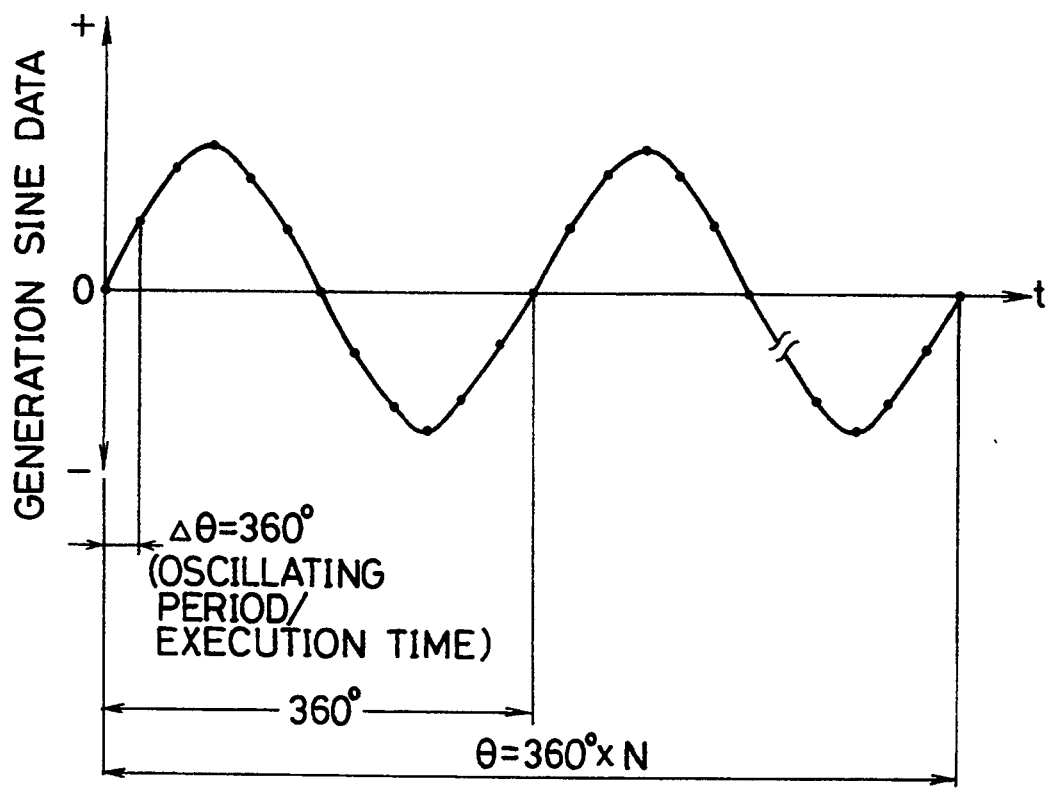
FIG. 10 is an explanatory diagram of a sine wave waveform which has a zero-cross frequency and which is generated by the measuring process of the invention.

When it is decided in step S102 that the measurement flag has been set to "1", step S103 follows and a check is made to see if the position control flag has been reset to "0" or not due to the head pull-in to the S104 follows. In step S104, sine data $D_s$ is generated target cylinder position to execute the measurement. When the position control flag is reset to "0", step S104 follows. In step S104, line data $D_s$ is generated every predetermined angle $\Delta\theta$ of the sine wave waveform. That is, as shown in FIG. 10, now assuming that one cycle is set to 360° in one measuring process, sine wave waveforms of N cycles are generated. The sine wave waveform is generated as discrete sine data $D_s$ in tile digital process. The generation angle $\Delta\theta$ of the sine data $D_s$ is calculated on the basis of an oscillating period of the zero-cross frequency $f_0$ and one executing time during which the measuring process in step S15 in the processing flow of FIG. 8 is executed. That is, by dividing the oscillating period of the zero-cross frequency $f_0$ by the executing time, the number of occurrence times per cycle is obtained. By dividing 300° by the number of occurrence times of one cycle, the generation angle $\Delta\theta$ per measuring process is obtained.

Returning to FIG. 9, after the sine data $D_a$ was generated, in step S104, the addition signal X from the adding section 74 shown in FIG. 5 is added to each position deviation signal Y which is fed back by the driving of the voice coil motor 10 based on the addition signal X. That is, the measurement data X and Y are accumulated and added for measuring cycle, thereby obtaining an integration approximate value.

Further, since (360°×N) has been set into the sine wave waveform generation angle $\theta$ in step S18 in FIG. 8, a predetermined angle $\Delta\theta$ required to generate one sine data $D_s$ is subtracted. In the next step S105, a check is made to see if the generation of the sine wave waveform has been finished or not. Practically speaking, when the sine wave waveform generation angle $\theta$ (re- maining generation angle) which is calculated in step S104 is equal to 0°, the generation of the sine wave waveform is finished.

When the end of generation of the sine wave waveform is decided in step S105, step S106 follows and the open loop gain $G_{OP}$ is calculated. Subsequently, the correction coefficient of the zone which is at present being measured is calculated from the product of the reciprocal number of the calculated open loop gain $G_{OP}$ and a correction coefficient initial value $K_0$. Since the zone of No. 0 is at present being measured, the zone No. 0 in FIG. 7 is stored as an address pointer into the correction table 18.

Figure 9:
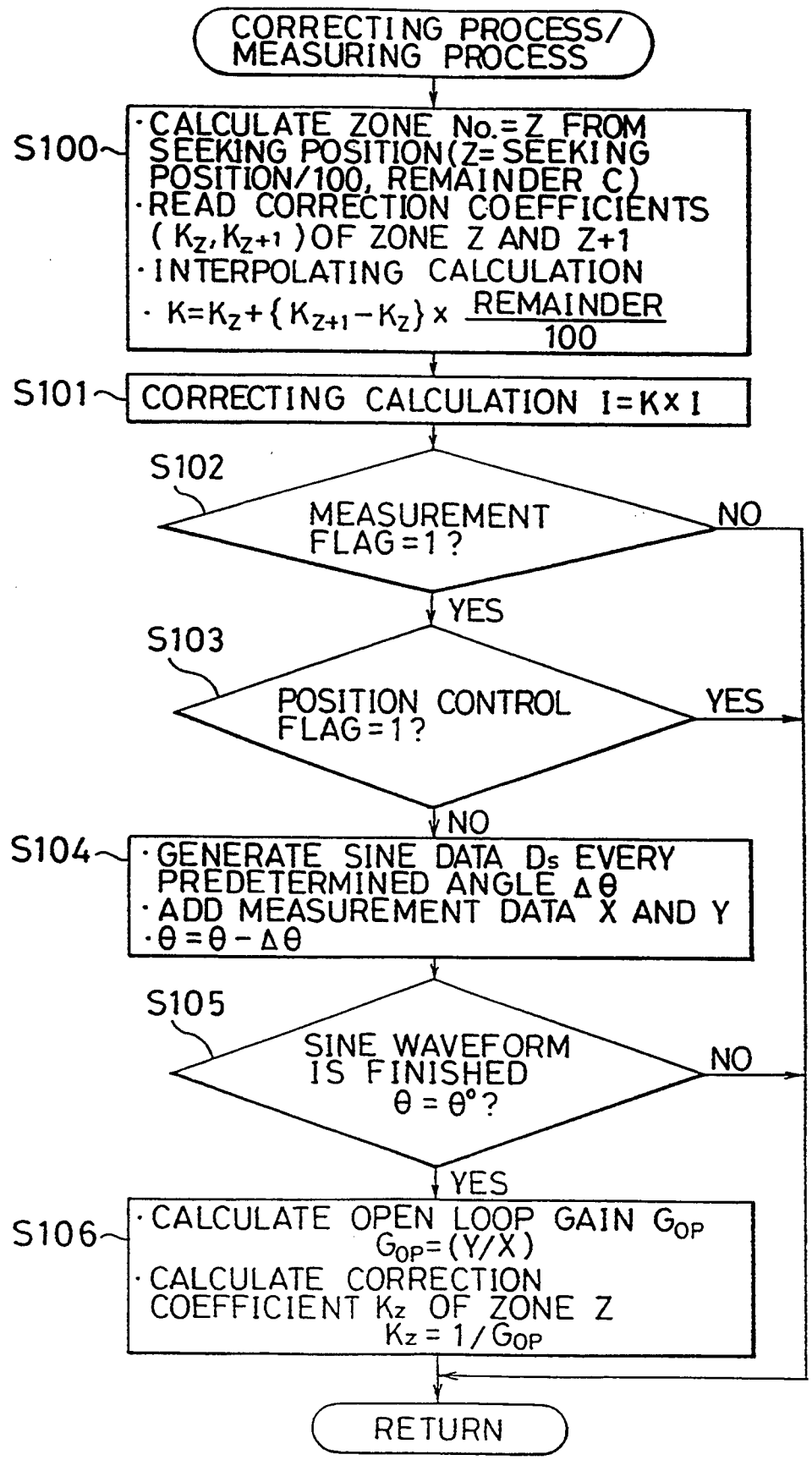
FIG. 9 is a flowchart showing a correcting process and a measuring process in FIG. 7 as subroutines.

The measuring process shown in the subroutine in FIG. 9 mentioned above is repeated until the final zone is judged in step S10 in FIG. 8. When the end of measurement of the final zone is judged in step S19, the measurement flag is reset to "0" in step S20 and the measurement mode is simultaneously reset, thereby setting the ordinary access possible state.

A correcting process using the correction table 18 will now be described. When the seek command from the higher order apparatus based on the read command or write command is received, the processing routine advances to step S5 through steps S1 to S4 because the measurement mode has already been cancelled in this instance. In step S5, the presence or absence of the seek command is discriminated. When the seek command exists in step S5, the cylinder No. indicative of the seeking position is set in step S6. In step the seek flag and the position control flag are set to "1". The speed control in steps S9 to S11 is executed. After completion of the speed control, the correcting process is executed in step S15.

Figure 11:
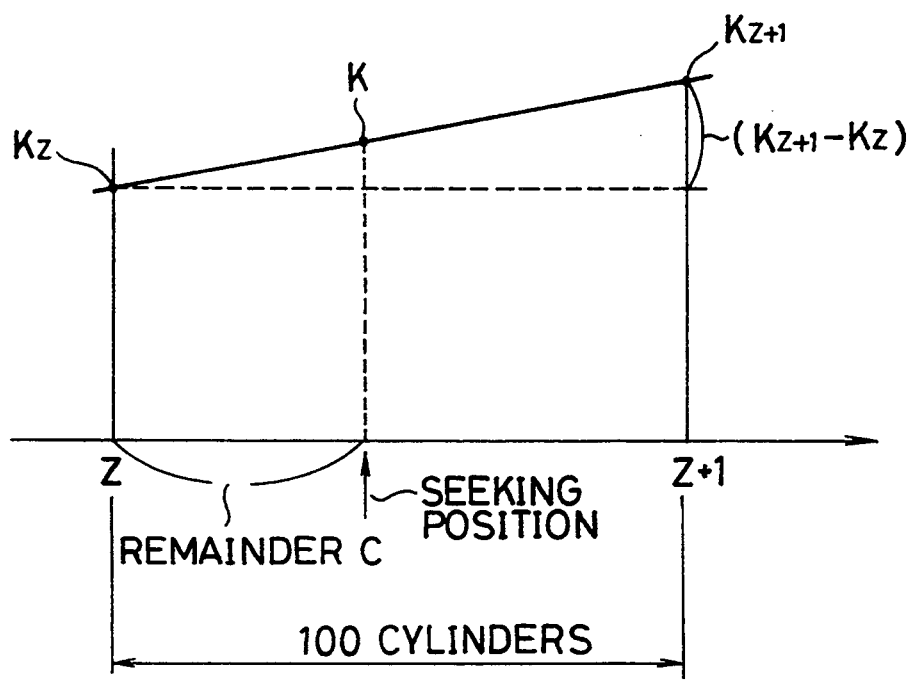
FIG. 11 is an explanatory diagram showing a state in which a correction coefficient is derived by the linear interpolation in the correcting process of the invention.

That is, as shown in step S100 in FIG. 9, an interpolating calculation to obtain the correction coefficient K is first executed on the basis of the present position. The interpolating calculation in step S100 is performed on the basis of the linear interpolation as an example. First, the zone No. Z is calculated from the cylinder No. indicative of the seeking position. That is, the cylinder No. indicative of the seeking position is divided by the number (=100) of cylinders per zone and the zone No. Z is obtained as an integer corresponding to the quotient and the number C of remaining cylinders is also obtained. Subsequently, a correction coefficient $K_z$ of the zone Z to which the seeking position belongs and a correction coefficient $K_{z+1}$ of the one-subsequent adjacent zone $Z+1$ are read out from the correction table 18. After that, the linear interpolating calculation shown in the diagram is executed. In the interpolating calculation, the value which is obtained by dividing the number C of the remaining cylinders by the number (=100) of cylinders per zone is multipled to a difference $(K_{z+1}-K_z)$ of the correction coefficients of the zones Z and $Z+1$ and the resultant value is added to the correction coefficient $K_z$ of the zone Z. The contents of the linear interpolating calculations are as shown in FIG. 11. In the next step S101, the correcting calculation is performed. Since the value of the drive current I which is supplied to the voice coil motor 10 has already been obtained at the stage of the speed control, by multiplying the correction coefficient K obtained in step S100 to the drive current I, as shown in FIG. 6, the drive current I due to the open loop gain according to the ideal characteristics 86 such that even if open loop characteristics are deviated as shown in the characteristics 88, the gain is equal to 0 dB at the zero-cross frequency $f_0$ can be calculated.

Since the measurement flag is equal to 0 in step S102, the processes in steps S103 to S106 are skipped and the processing routine is returned to step S16 in FIG. 8. The data of the drive current I obtained by the correcting calculation is supplied to the D/A converter 82 and the corrected drive current I is allowed to flow in the voice coil motor 10. When the completion of the speed control is judged in step S10 and the seek flag is reset to "0" in step S11, the processing routine is returned to step S1. After that, step S8 follows. Since the seek flag has been reset to "0" in step S8, the processing routine advances to the position control in step S12. In the position control as well, the drive current I calculated in step S12 is corrected by the correcting process in step S15 by using the correction coefficient K which has been calculated in this instance. The positioning control according to the ideal open loop characteristics 86 such that the open loop gain is equal to 0 at the zero-cross frequency $f_0$ in FIG. 6 can be performed.

According to the present invention as mentioned above, in the case where the magnetic force of the permanent magnet in the voice coil motor 10 is weak or the loop loss is large, the loop gain is corrected so as to be increased and a slightly large drive current is allowed to flow. On the contrary, when the magnetic force of the permanent magnet is strong or at a position of the small loop loss, the value of the loop gain is reduced and a slightly small current is allowed to flow. Due to this, even at any position, the voice coil motor 10 can always generate a predetermined driving force.

Therefore, the variation in servo loop characteristics due to a change in cylinder position and the variation in servo loop characteristics of every magnetic disk apparatus can be suppressed and can be set to be almost constant. The head positioning control of a high accuracy corresponding to the high density recording can be executed.

The present invention is not limited to the foregoing embodiment but many modifications and variations are possible within the spirit and scope of the appended claims of the invention. The present invention is also not limited to the numerical values used in the above embodiment.

What is claimed is:

1. A positioning control method of a head which is used in a magnetic disk apparatus, comprising:

a servo control step of moving the head to a cylinder position on a disk medium designated by a command from a higher order apparatus by a speed control of an actuator and switching a control mode to a position control when the head reaches said cylinder position, thereby allowing the head to trace a track on the medium;

a measuring step of adding a sine wave signal having a zero-cross frequency $f_0$ of open loop gain characteristics to a drive signal of said actuator in a state in which the head has been moved to a predetermined cylinder position and has been position controlled when a measurement mode is set, outputting a resultant addition signal X, calculating an open loop gain $G_{OP}$ from said addition signal X and an actual position deviation signal Y which is fed back by the driving of the actuator due to the addition signal X, and further calculating a new correction coefficient K by the product of the reciprocal number of said open loop gain $G_{OP}$ and a correction coefficient K used in the measurement;

a correction table updating step of storing the new correction coefficient K obtained in said measuring step into a correction table while using the cylinder position as an address pointer; and a correcting step of reading out the correction coefficient K with reference to said correction table on the basis of the cylinder position at which the head is at present located when an ordinary mode is set, correcting the drive signal to said actuator by multiplying said read-out correction coefficient K to said drive signal, and outputting said corrected drive signal to the actuator.

2. A method according to claim 1, wherein in said correction table updating step, a correction coefficient K which has previously been obtained is stored as an initial value into the correction table just after a power source of the apparatus was turned on, and further, in said measuring step, after the power source of the apparatus was turned on, said measurement mode is set in accordance with a predetermined time schedule, thereby updating the correction coefficient K in the correction table.

3. A method according to claim 2, wherein a time interval to set the measurement mode in accordance with said time schedule is set to a time interval which increases with the elapse of time from the turn-on of the power source.

4. A method according to claim 1, wherein in said measuring step, a predetermined number of cylinders are set to one group, the disk medium is divided into a plurality of zones, and a correction coefficient obtained by designating a predetermined cylinder position of each zone is stored into the correction table on a zone unit basis.

5. A method according to claim 4, wherein in said correcting step, in the case where the correction coefficients have been stored in the correction table on a zone unit basis, the correction coefficient K of the target cylinder position is calculated by an interpolating calculation based on a correction coefficient $K_i$ of the zone $Z_i$ to which the target cylinder belongs and a correction coefficient $K_{i+1}$ of the adjacent zone $Z_{i+1}$.

6. A method according to claim 5, wherein in said interpolating calculation, the target cylinder position is divided by the number of cylinders per zone and the belonging zone $Z_i$ and the number C of remaining cylinders are obtained, and the correction coefficient K at the target cylinder position is calculated by the following linear interpolating calculation $$K = K_i + (K_{i+1} - K_i) \cdot \frac{\text{the number } C \text{ of remaining cylinders}}{\text{(the number of cylinders per zone)}}$$

7. A method according to claim 1, wherein in said measuring step, a sine wave having the zero-cross frequency $f_0$ is continuously generated for a plurality of cycles, and the correction coefficient K is calculated from the mean value of a plurality of open loop gains $G_{OP}$ derived by the generation of the sine waves for the whole cycle angle $\theta$.

8. A method according to claim 7, wherein in said measuring step, a discrete value of every predetermined angle $\Delta\theta$ of the sine wave having the zero-cross frequency $f_0$ is generated for a plurality of cycles, the open loop gain $G_{OP}$ is calculated every generation of said discrete value, and the correction coefficient K is calculated from the mean value of said plurality of open loop gains $G_{OP}$ obtained by the generation of the discrete values for the whole cycle $\Delta\theta$.

9. A positioning control apparatus of a head which is used in a magnetic disk apparatus, comprising:

servo control means for moving the head to a cylinder position on a disk medium designated by a command from a higher-order apparatus by a speed control of an actuator and switching a control mode to a position control when the head reaches said cylinder position, thereby allowing the head to trace a track on the medium;

measuring means for adding a sine wave signal having a zero-cross frequency $f_0$ of open loop gain characteristics to a drive signal of said actuator in a state in which the head has been moved to a predetermined cylinder position and has been position controlled by said servo control means when a measurement mode is set, outputting a resultant addition signal X, calculating an open loop gain $G_{OP}$ from said addition signal X and an actual position deviation signal Y which is fed back by the driving of the actuator due to the addition signal X, and further calculating a new correction coefficient K by the product of the reciprocal number of said open loop gain $G_{OP}$ and a correction coefficient K used in the measurement;

correction table means for storing said new correction coefficient K measured by said measuring means while using the cylinder position as an address pointer;

scheduling means for instructing processes to set said measurement mode in accordance with a predetermined time schedule and measure the correction coefficient by said measuring means and update said correction table means; and correcting means for correcting the drive signal of the actuator supplied from said servo control means by multiplying the correction coefficient K which has been read out with reference to said correction table means at the cylinder position at which the head is at present located to said actuator drive signal and outputting said corrected drive signal to the actuator.

10. An apparatus according to claim 9, wherein said scheduling means is constructed in a manner such that, just after a power source of the apparatus was turned on, a correction coefficient K which has previously been obtained is stored as an initial value into said correction table means, the measurement mode is set, the correction coefficient in the correction table means is updated by said measuring means, and thereafter, the measurement mode is set in accordance with a predetermined time schedule, thereby updating the correction coefficient K in the correction table means.

11. An apparatus according to claim 10, wherein said scheduling means sets a time interval to set the measurement mode in accordance with the time schedule into a time interval which increases with the elapse of a time from the turn-on of the power source.

12. An apparatus according to claim 10, wherein said measuring means sets a plurality of cylinders into one group and divides the disk medium into a plurality of zones and stores the correction coefficient obtained by designating a predetermined cylinder position of each zone into said correction table means on a zone unit basis.

13. An apparatus according to claim 12, wherein said correcting means has interpolation calculating means for calculating a correction coefficient K at the target cylinder position by an interpolating calculation based on a correction coefficient $K_i$ of a zone $Z_i$ to which the target cylinder belongs and a correction coefficient $K_{i+1}$ of an adjacent zone $Z_{i+1}$ in the case where the correction coefficients have been stored in said correction table means on a zone unit basis.

14. An apparatus according to claim 13, wherein said interpolation calculating means divides the target cylinder position by the number of cylinders per zone and obtains the belonging zone $Z_i$ and the number C of remaining cylinders and calculates the correction coefficient K at the target cylinder position by the following linear interpolating calculation $$K = K_i + (K_{i+1} - K_i) \cdot \frac{\text{the number } C \text{ of remaining cylinders}}{\text{(the number of cylinders per zone)}}$$

15. An apparatus according to claim 9, wherein said measuring means continuously generates a sine wave having the zero-cross frequency $f_0$ for a plurality of cycles and calculates the correction coefficient K from the mean value of a plurality of open loop gains $G_{OP}$ obtained by the generation of the sine waves for a whole cycle angle $\theta$.

16. An apparatus according to claim 15, wherein said measuring means generates a discrete values of every predetermined angle $\Delta\theta$ of the sine wave having the zero-cross frequency $f_0$ for a plurality of cycles and calculates the open loop gain $G_{OP}$ every generation of said discrete value and calculates the correction coefficient K from the mean value of a plurality of open loop gains $G_{OP}$ obtained by the generation of the discrete values for the whole cycle $\theta$.

* * * * *

UNITED STATES PATENT AND TRADEMARK OFFICE
CERTIFICATE OF CORRECTION

PATENT NO. : 5,339,206
DATED : August 16, 1994
INVENTOR(S) : Takahashi

It is certified that error appears in the above-indentified patent and that said Letters Patent is hereby corrected as shown below:

Delete the block from column 5, line 12 starting with head through line 36 ending with control and insert the block at column 4, line 54. after servo.
    Column 7, line 39, delete out! put and insert --output--.
    Column 7, line 63, delete tile and insert --the--.
    Column 9, line 5, delete S$7 and insert --S7--.
    Column 9, line 34, before S104 insert --target cylinder position to execute the measurement. When the position control flag is reset to 0, step--.
    Column 9, line 43, delete tile and insert --the--.
    Column 10, line 31, after step insert --S7--.
    Column 11, line 21, before at insert --dB--.
    Column 11, line 27, delete tile and insert --the--.

Signed and Sealed this

Fourth Day of July, 1995

*Attest:*

BRUCE LEHMAN

*Attesting Officer*     *Commissioner of Patents and Trademarks*